United States Patent [19]
Geschwender

[11] Patent Number: 5,795,070
[45] Date of Patent: Aug. 18, 1998

[54] THERMOMETER

[76] Inventor: Robert C. Geschwender, 3855 Orchard St., Lincoln, Nebr. 68503

[21] Appl. No.: 870,251

[22] Filed: Jun. 6, 1997

Related U.S. Application Data

[63] Continuation of Ser. No. 573,156, Dec. 15, 1995, abandoned.

[51] Int. Cl.$^6$ .............................. G01K 5/62; G01K 5/68
[52] U.S. Cl. ............................................. 374/206; 374/205
[58] Field of Search ...................................... 374/205, 206

[56] References Cited

U.S. PATENT DOCUMENTS

| | | |
|---|---|---|
| D. 236,815 | 9/1975 | Van Kersen . |
| D. 242,329 | 11/1976 | Van Kersen . |
| D. 246,032 | 10/1977 | McLeod . |
| 376,103 | 1/1888 | Mitchell . |
| 2,471,704 | 5/1949 | Rose et al. . |
| 2,597,939 | 5/1952 | Lamb . |
| 2,793,605 | 5/1957 | Helgeby . |
| 3,161,057 | 12/1964 | Du Bois . |
| 4,104,916 | 8/1978 | Hofer . |
| 4,211,114 | 7/1980 | Hood . |
| 4,538,926 | 9/1985 | Chretien . |

FOREIGN PATENT DOCUMENTS 1342725   1/1974   United Kingdom .

OTHER PUBLICATIONS

"Catalog No. 193," Chaney Instruments Co., Jun. 1995.
"1995 Catalog," Brookstone, Inc., pp. 19 & 22, Jun. 1995.
"Rain Gauge," B & L Industries, Jun. 1995.

*Primary Examiner*—Diego F.F. Gutierrez
*Attorney, Agent, or Firm*—Laff, Whitesel, Conte & Saret, Ltd.

[57] ABSTRACT

A thermometer includes a housing with a C-shaped window therein and a temperature scale adjacent to the window. A member within the housing has a colored or shaded region with a boundary visible through the window. The colored region is sufficiently large so that it fills the window from the lower side of the temperature scale up to the boundary. The boundary is moved relative to the temperature scale by a bimetal coil spring. The boundary and the colored region indicate the temperature being read by the thermometer. In one version of the invention, the window extends in an arc of about 180°, the member is a substantially planar disk, and the colored region is a semi-circular portion of the disk. The disk is mounted within the housing on a shaft, and the disk rotates relative to the shaft. The thermometer is easily readable under a variety of viewing conditions, especially adverse viewing conditions.

17 Claims, 3 Drawing Sheets

5,795,070

1

THERMOMETER

This is a continuation of application Ser. No. 08/573,156 filed on Dec. 15, 1995, now abandoned

FIELD

This invention relates to measuring devices, and more particularly, to a thermometer.

BACKGROUND

Thermometers generally include a temperature scale and means to indicate the current temperature being measured. One well-known form of thermometer uses expansion or contraction of a volume of liquid, such as mercury or colored alcohol, within a columnar, glass tube. An appropriate temperature scale is disposed on or adjacent to the glass tube and, as is well-known, the temperature is read by aligning the top of the column of liquid with the corresponding mark on the temperature scale.

Although such columnar, liquid-based thermometers are used in a variety of temperature ranges, they nonetheless suffer from various drawbacks and disadvantages. For example, liquid-based thermometers are at times difficult to read, especially when the viewer has poor eyesight, when the thermometer is distant, or under any other adverse viewing conditions, such as rain, condensation, frost, or low light. It is difficult under these and other circumstances for the viewer to accurately perceive the location of the top of the liquid and hence gauge the temperature.

Attempts to improve readability of columnar thermometers remain generally limited by the inherent expansion characteristics of the liquid used. Thus, even if one attempts to improve readability by having the temperature scale span a greater linear distance, the column of liquid is required to be relatively thin and thus remains generally difficult to perceive. Also, the greater linear distance spanned by the temperature scale generally requires the thermometer to assume a correspondingly larger elongated shape, which, in turn, requires a correspondingly larger area to be set aside for mounting or otherwise visually accessing the thermometer. This generally inhibits such thermometers from being useful or adaptable to mounting or viewing areas where space is limited.

If the diameter of the column of liquid were increased, the expansion and contraction characteristics of the liquid would generally require the temperature scale to be compressed, again, making the thermometer difficult to read. Other attempts at improving readability have involved little more than increasing the size of the numerals of the temperature scale. While this attempted solution may allow the numerals themselves to be more easily perceived, it does not address the difficulty in accurately determining the location of the top of the column in relation to the enlarged numerals. Hence, such thermometers still lack an effective way to accurately and easily read the temperature indicated thereon.

Another type of thermometer uses a bimetal spring attached to a shaft of a rotatable dial with a temperature scale thereon. Such devices are disclosed in UK Pat. No. 1,342, 725 to Martin, as well as in U.S. Pat. Nos. 4,211,114, 3,161,057, and 2,597,939. In these structures, the temperature scale is disposed on a member which moves in relation to an indicator line or pointer, often located in a window. These devices also suffer from drawbacks and disadvantages. For example, the usage of a pointer or indicating line makes them, like the liquid-filled thermometers discussed above, difficult to read at times, especially under the adverse

2 viewing circumstances or conditions discussed previously. Since, in order to perform its intended function, the pointer is generally elongated, thin or terminates in a pointed tip, it is often hard to perceive the end of the pointer and thus it is difficult to read the temperature being indicated.

A variation to the bimetal thermometers discussed above uses a pointer which rotates in relation to a stationary, generally circular face with a temperature scale thereon. Even where the pointer is a different color from that of the face, the inherent geometry of the pointer, again, makes it often difficult to perceive, especially when the thermometer is distant, when the viewer has poor eyesight, or under any other adverse viewing circumstances or conditions, such as rain, condensation, frost, glare, or low light.

Certain versions of these, rotating-pointer-type thermometers may have colored regions on the stationary face of the thermometer. This shading or coloring is used to characterize the temperature region, such as a freezing zone in UK Pat. No. 1,342,725 discussed previously, or the temperature zones of U.S. Pat. No. 2,471,704 to Rose. These colored zones fail in various respects to address the above discussed drawbacks and disadvantages. For example, a pointer with a thin tip is still used to indicate temperature in the various zones of the thermometer. Since the pointer is difficult to perceive, the temperature is difficult to read.

Another type thermometer uses cholesteric liquid crystals which are activated and assume certain colors at certain temperatures. Examples of such thermochromatic thermometers are disclosed in U.S. Pat. Nos. 4,538,926, 4,211,114, and D 236,815. In addition to various other drawbacks and disadvantages, this type of thermometer has not been adapted for use under the adverse viewing conditions and circumstances discussed above because, among other reasons, it is difficult to perceive the change in color of the cholesteric liquid crystals under many circumstances. In addition, the useful temperature ranges for such cholesteric crystals and the ability to read temperature in less than two-degree increments are often limited in such thermometers. Furthermore, in many cases, viewers unfamiliar with such thermochromatic thermometers will need extra time to figure out which of the regions of liquid crystals are currently being illuminated. Hence, determining the temperature will become a more time consuming and, perhaps, frustrating experience than with those thermometers involving movement of pointers, dials, or columns of liquid.

Thus, there is a need for a thermometer which is easy to read under a variety of viewing conditions and circumstances by a variety of individuals.

There is a further need for such a thermometer to be easy to read without taking up excessive space when it is installed or mounted.

SUMMARY

Accordingly, an object of the present invention is to provide a new and improved thermometer which vividly displays the temperature reading.

A further object is for the vivid display to be readily perceived and understood by the viewer.

Another object of this invention is to provide a thermometer which is not only easy to read, but also is suitable for installing and mounting under a variety of conditions and in a variety of locations.

The foregoing and other objects and advantages are attained, according to the present invention, by a thermometer which has a housing with a window therein and a temperature scale in a fixed position on or near the window. Within the housing is a member with a color region which has a boundary visible through the window at any temperature within the range of the temperature scale. The member is mounted so as to be movable with respect to the housing, and the colored region is sufficiently large so that it fills the window to one side of the boundary whenever the boundary is visible in the window. The thermometer includes a mechanism or other facility responsive to changes in temperature for moving the boundary in relation to the temperature scale thereby indicating the temperature with a vivid colored region which extends from one side of the window up to the boundary.

The mechanism for moving the boundary relative to the temperature scale may include a bimetal spring with one spring end connected to the housing and the other spring end connected to the moving member. The bimetal spring may be a coil, and one end of the coil may be slip-fit within a channel defined in the member.

According to another aspect of the invention, the member is rotatably mounted within the housing about its center of mass. The window has an edge extending in an arc and the colored region extends over an arc which is at least as great as the arc traced by the window.

In accordance with another aspect of this invention, the member is a disk rotatably mounted within the housing, and the colored region extends over a sector of the disk. The boundary which moves relative to the window is one of the radii which form the colored sector on the disk. The window is formed in the shape of an annular sector which extends about 180° (i.e., a C-shaped window) and the colored region may comprise either a corresponding annular sector or a corresponding sector of a circle.

The housing according to yet another aspect of the invention includes a face plate, and the window is mounted on the face plate. A shaft extends substantially orthogonally from the face plate and the movable member is mounted on the shaft and is rotatable with respect thereto. The shaft may have a reduced diameter at the contact point between the rotatable member and the shaft to reduce friction.

Still other objects, advantages, and novel aspects of the present invention will become apparent in the detailed description of the invention that follows, in which the preferred embodiment of the invention is shown by way of illustration of the best mode contemplated for carrying out the invention, and by reference to the attached drawings in which:

DESCRIPTION

Figure 1:
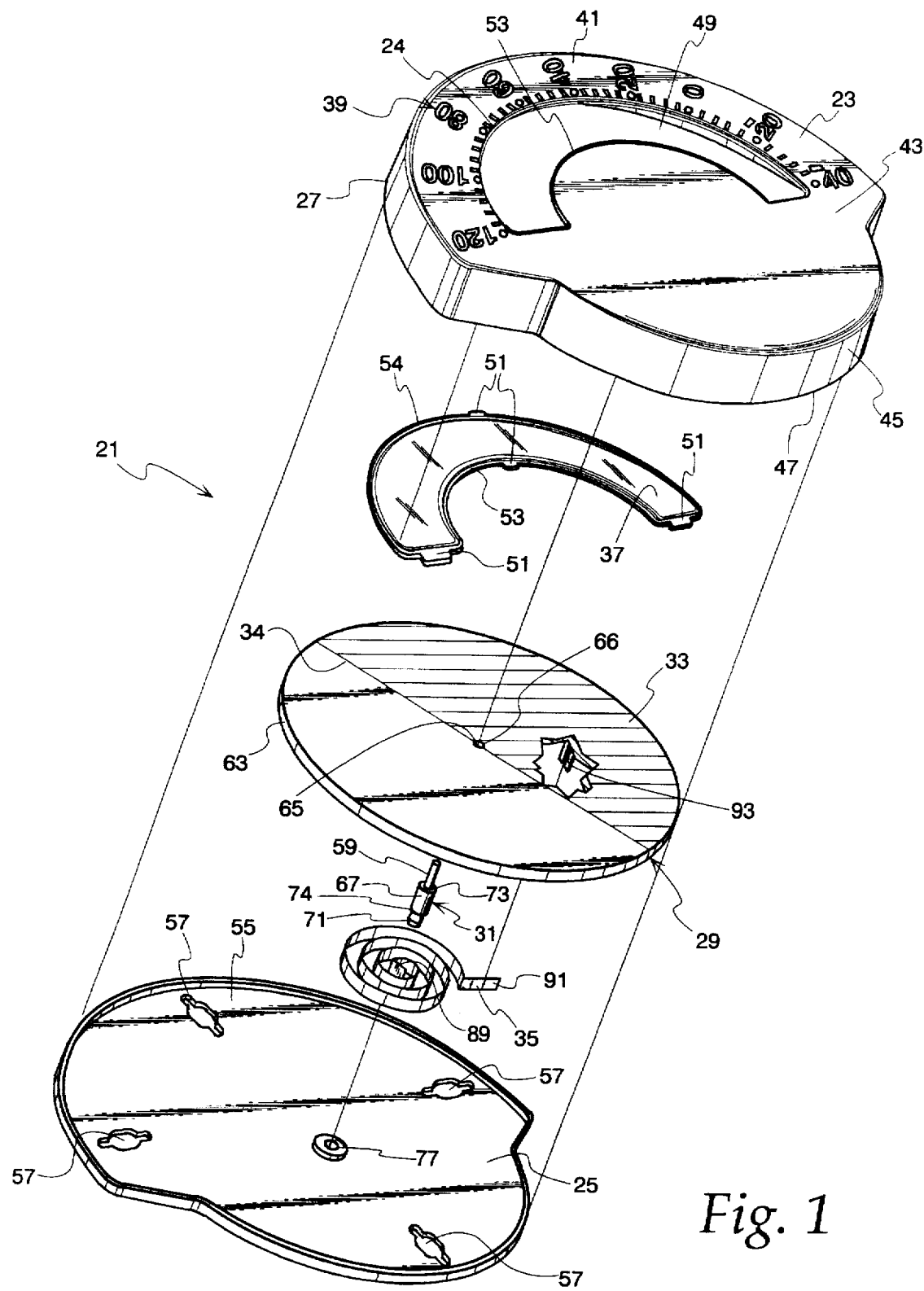
FIG. 1 is an exploded, perspective view of a thermometer embodying the principles of the present invention with FIG. 1a showing an alternative colored annular region on the temperature-indicating disk of the thermometer.
Figure 3:
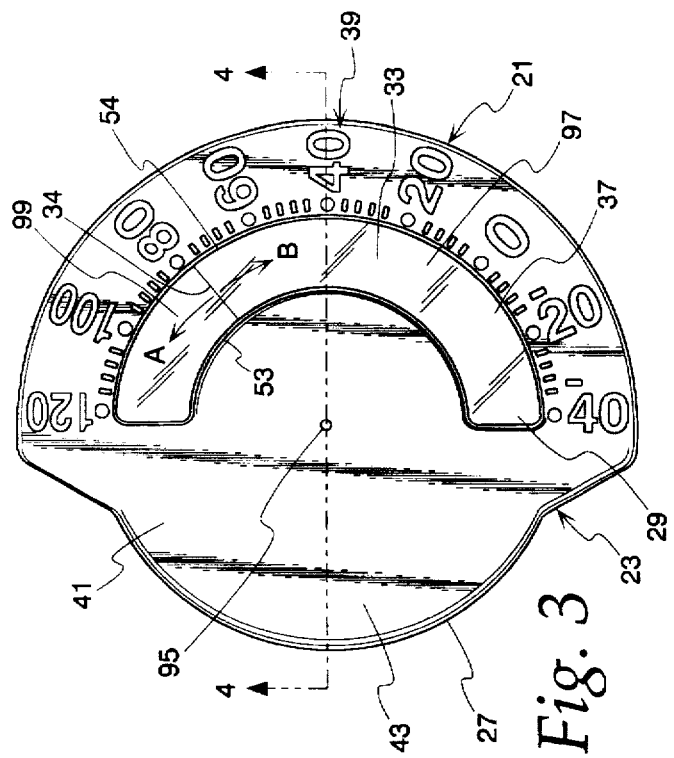
FIG. 3 is a front, elevational view of the thermometer of FIG. 1.
Figure 2:
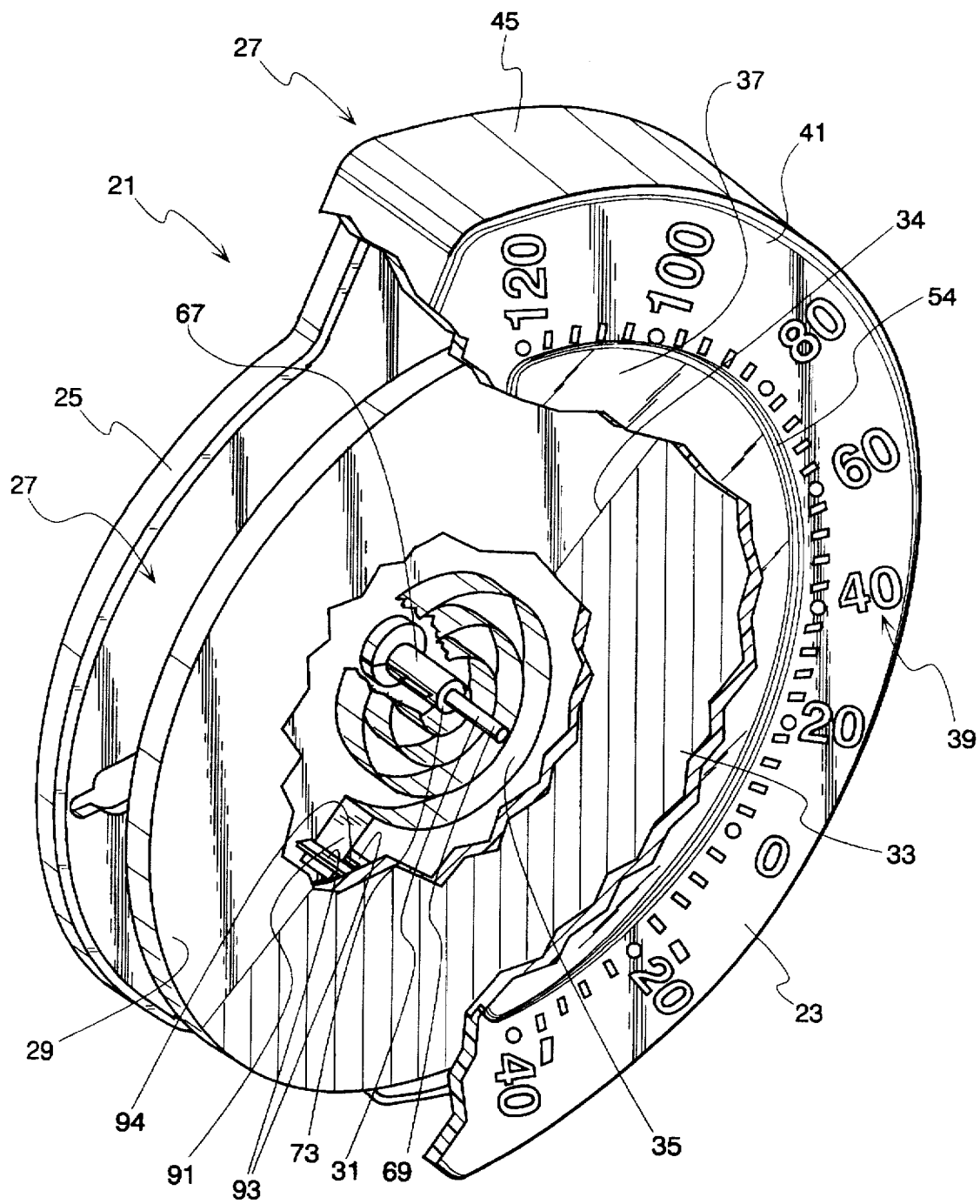
FIG. 2 is a perspective view of the thermometer of FIG. 1 with portions cut-away to better illustrate the invention.

Referring now to the drawings, and particularly to FIGS. 1–3, a thermometer 21 according to the present invention includes a face plate 23 which fits over a mounting plate 25 to form a thermometer housing 27. A member 29 is mounted within the housing 27 about a shaft 31 and is rotatable with respect thereto. The thermometer 21 includes means, here shown as a bimetal, coil spring 35, responsive to changes in temperature for moving the member 29 relative to the housing 27.

The member 29 includes a shaded or colored region 33 which is demarcated by a boundary 34. The member 29 is mounted within the housing 27 so that a least a portion of the boundary 34 is visible through a substantially transparent window 37 in the face plate 23, as best seen in FIG. 3. The colored region 33 is sufficiently large so that it appears in the window 37 to one side of the boundary. In the embodiment shown in FIG. 3, the colored region 33 fills the window 37 to one side of the boundary 34.

In operation, changes in temperature cause the coil spring 35 to change shape and rotate the boundary 34 relative to a temperature scale 39 which is in a fixed position relative to, and operatively associated with, the window 37. The measured temperature is thus vividly indicated through the window 37 being filled with the colored region 33 to one side of the boundary 34, the boundary 34 being aligned with the point on the temperature scale 39 corresponding to the measured temperature.

Referring to FIGS. 1–4, the face plate 23 has a substantially planar surface 41 which includes a region 43 suitably sized for placement of any form of graphics, words, or advertisement (not shown). A sidewall 45 extends from the edge of the planar surface 41 generally perpendicularly and terminates in an edge 47.

In the preferred embodiment, the face plate 23 has the window 37 formed as a separate, C-shaped or arcuate member which is secured in a corresponding aperture 49 (FIG. 1) in the planar surface 41 of the face plate 23. The edges of the window 37 are held in a registered position with the edges of the aperture 49 by any suitable attaching means, such as tabs 51 on the window 37 with corresponding slots (not shown) adjacent to the aperture 49.

The window 37 thus comprises an annular segment with inner and outer edges 53, 54 which extend over an arc of, preferably, 180°. The temperature scale 39 is operatively associated with the window 37 by being positioned with temperature markings adjacent to the outer edge 54 of the window 37.

The mounting plate 25 includes a substantially planar surface 55 of a size and shape corresponding to the edge 47 of the face plate 23 and thereby allows the plates 23, 25 to be brought into registry with one another to form the housing 27 which encloses the other elements of the thermometer 21. The planar surface 41 of the face plate 23 and the planar surface 55 of the mounting plates 25 are substantially parallel to each other. The planar surface 55 includes portions defining a series of mounting apertures 57 suitable for securing the thermometer 21 to a mounting surface (not shown).

Figure 1A:
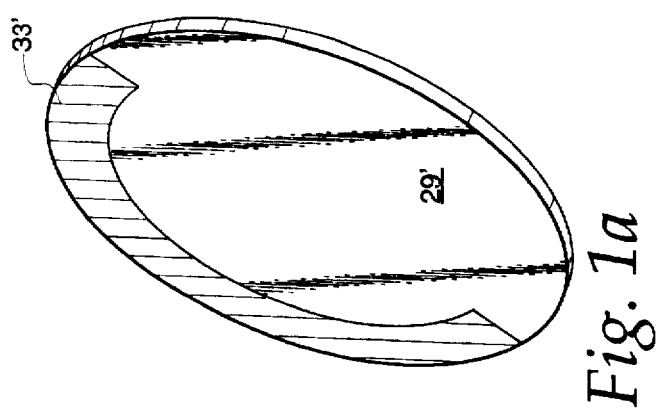

The member 29 enclosed within the housing 27 is preferably formed in the shape of a substantially planar disk. The colored region 33 extends over a sector of the disk, and the boundary 34 lies along one of the radii which form the sector of the disk. In an alternative embodiment, a colored annular region 33' on member 29' is positioned to appear within window 37, as shown in FIG. 1a. The colored region 33 preferably extends over a sector of about 180° and is colored red or any other suitable color which contrasts with the remaining portion of the member 29. The member 29 includes outer annular portion 59 best seen in FIG. 4 which is relatively thinner than annular portion 61 which is located radially inwardly from the portion 59. The relatively thinner portion 59 reduces the overall weight of the member 29. A peripheral edge 63 extends substantially orthogonally from the outer end of the portion 59 of the member 29.

Figure 4:
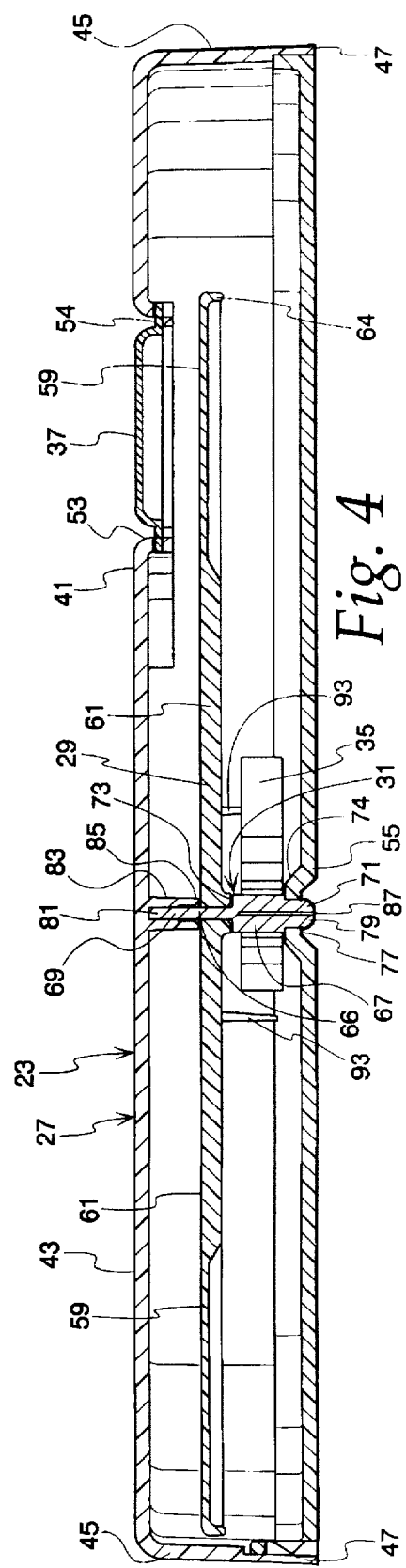
FIG. 4 is a side, sectional view taken along line 4—4 of FIG. 3.

Two pairs of tines 93 (of which one is shown in FIGS. 1 and 2) extend from the surface of the member 29 which faces the mounting plate 25. The pairs of tines 93 are symmetrically disposed on the member 29 with relation to the center of mass of the member 29, as best shown in FIG. 4. A channel 94, best seen in FIG. 2, is defined between the tines of each of the pairs.

The member 29 is sized so as to be movable within the housing 27 without contacting the sidewall 45 or any other portion of the plates 23, 25. The member 29 is mounted within the housing 27 by receiving a portion of the shaft 31 within an aperture 65 located at the center of the disk. The aperture 65 is sized so that the member 29 can rotate relative to the shaft 31. The aperture 65 is located at the center of mass of the member 29, and the member 29 is thus mounted about its center of mass to the shaft 31.

The shaft 31 includes a medial portion 67 of substantially cylindrical shape, coaxially aligned neck portion 69 having a smaller diameter than the medial portion 67, and a coaxially aligned tail portion 71. A flange 73 is formed at the intersection of the portions 67, 69 by virtue of the differences in diameter between these two portions. A similar flange 74 is formed at the intersection of the portions 67, 71.

The shaft 31 is mounted between the plates 23, 25 and extends within the housing 27 substantially orthogonally to the planar surfaces 41, 55 of the respective plates 23, 25. The tail portion 71 is received in a snug-fit manner into an aperture 77 which extends through the planar surface 55 of the mounting plate 55. Because the aperture 77 extends entirely through the planar surface 55, the shaft 31 is accessible from outside of the housing 27, as best seen in FIG. 4.

Referring to FIG. 4, end 81 of the shaft 31 is received into a cavity 83 formed in the face plate 23 and in communication with the housing 27. The neck portion 69 extends from edge 85 of the cavity 83 a sufficient amount so that, when the neck portion 69 is received in the aperture 65 (FIG. 1) of the member 29, rotation of the member 29 is not substantially inhibited by excessive contact between the member 29 and the edge 85 or the flange 73.

Although the edge 85 and the flange 73 do not inhibit rotation of the member 29, these elements act to inhibit movement of the member 29 in a longitudinal direction with respect to the axis of the shaft 31. In particular, the edge 85 and the flange 73 extend beyond the diameter of the aperture 65 and thus may come into occasional contact with portions of the member 29 in the event that the member 29 moves longitudinally during its rotation or at any other times. In this way, the member 29 is prevented from "creeping" in the longitudinal direction while it rotates and undesirably contacting the substantially planar surfaces 41, 55 of the respective plates 23, 25.

As best seen in FIGS. 1 and 4, the aperture 65 is defined by a substantially unidimensional edge 66. The unidimensional edge 66 of the member 29 creates a single bearing about which the member 29 rotates in relation to the shaft 69, rather than two bearings as would be the case if the shaft 69 itself were to rotate in response to changes in temperature. Such mounting about the single bearing or edge 66 reduces undesireable friction.

Single-bearing mounting of the member 29 has an additional advantage. Precise alignment of the cavity 83 and the aperture 77 reduces friction between the shaft 31 and edges of the cavity 81 and the aperture 77. However, because the shaft 31 is not required to rotate according to the present invention, there is no need to reduce such friction and therefore no need to precisely align the cavity 83 and the aperture 77.

The shaft 31 is sized and configured so that the end 81 of the neck portion 69 abuts the bottom of the cavity 83 and the flange 74 (FIGS. 1 and 4) abuts the inner edge of the aperture 77 of the mounting plate 25. In this way, the shaft 31 maintains separation of the inner surfaces of the plates 25, 27. Thus, in the event the plates 25, 27 are exposed to inwardly directed forces, the shaft 31 prevents the inner surfaces of the plates 25, 27 from undesireably moving toward or contacting the rotatably mounted member 29.

The shaft 31 includes a slit 87 which extends from end 79 longitudinally through the shaft 31 into the medial portion 67. The slot 87 extends entirely through the shaft 31 in the transverse direction, thereby dividing the tail portion 71 into two halves so that it can be press-fit into the aperture 77 (FIGS. 1 & 4) of the mounting plate 25 to retain the shaft 31 in a snug-fit manner. The slot 87 also permits a corresponding blade, such as that of a screw driver, to be inserted within the slot 87 to allow the shaft 31 to be rotated relative to the mounting plate 25 for adjustment of the thermometer as described subsequently.

The thermometer 21 includes means, here shown as the bimetal coil spring 35, responsive to changes in temperature for moving the member 29 relative to the face plate 23. Such movement of the member 29 moves the boundary 34 relative to the temperature scale 39 to indicate temperature. Referring once again to FIGS. 1 and 2, the spring 35 has an inner end 89 which is received at the medial portion 67 through the slot 87. Outer end 91 of the spring is received in a slip-fit manner in the channel formed between the tines 93 of the member 29. The tines 93 extend toward the mounting plate 25 a sufficient distance so that when the spring end 89 is received within the medial portion 67 and the spring end 91 is received in the channel 94 between the tines 93, the coil of the spring 35 is disposed generally parallel to the mounting plate 25.

The annular-shaped window 37 and the boundary 34 share a common centerpoint 95 (FIG. 3) which in turn coincides with the longitudinal axis of the shaft 31 about which the member 29 rotates.

The operation of the thermometer 21 according to the present invention is apparent from the above description. Changes in temperature cause the spring 35 to expand or contract, which in the case of a coil spring, generally causes the coil to wind or unwind. Expansion or contraction of the spring 35 causes its outer end 91 to move in an angular direction relative to the point where the spring's inner end 89 is mounted, that is, relative to the shaft 31. Since the end 91 is connected to the member 29, the angular movement of the end 91 causes the member 29 to rotate relative to the shaft 31 and the face plate 23. The movement of the member 29, in turn, moves the boundary 34 relative to the temperature scale 39, thereby indicating temperature and changes in temperature.

Expansion and contraction of the spring 35 not only causes angular movement of the end 91 but also changes the effective diameter of the spring 35. Such changes in diameter are likely to cause the end 91 to move relative to the tines 93 as the diameter of the spring 35 increases or decreases. The end 91 extends a sufficient amount so that at all temperatures on the temperature scale 39, the end 91 remains engaged in a slip-fit manner between the tines 93.

Referring to FIG. 3, at least a portion of the boundary 34 is visible through the window 37. Since the boundary 34, the shaft 31, and the window 37 share the common centerpoint 95 (FIG. 3), the visible portion of the boundary 34 extends across the window 37 radially in relation to the center point 95. As temperature increases, the boundary 34 moves in the counterclockwise direction indicated by arrow A, and as temperature decreases, in the clockwise direction indicated by arrow B.

The colored region 33 fills the window 37 from the bottom of the temperature scale up to the boundary 34. The temperature is indicated by the position of the boundary 34 relative to the temperature scale 39 which, in this embodiment, is adjacent to the window 37. The temperature is indicated vividly by virtue of the colored region 33 appearing in the window to one side of the boundary and, in this embodiment, filling the window from the bottom of the temperature scale all the way up to the current temperature being read at the boundary 34.

The thermometer 21 may be mounted to a vertical surface (not shown) in the position shown in FIG. 3. When the thermometer 21 is thus mounted, the window 37 has a lower portion 97 corresponding to the lower end of the temperature scale 39, and an upper portion 99 corresponding to the upper end the temperature scale 39. In this way, the movement of the boundary 34 relative to the temperature scale 39 simulates the movement of expandable liquid in a columnar thermometer.

To calibrate the thermometer 21, a screw driver or other flat blade may be inserted into the slot 87 which is accessible through the aperture 77 in the mounting plate 25. The shaft 31 can then be rotated by torquing the blade, which adjusts the spring position and, thereby, the position of the boundary 34 relative to the temperature scale 39.

Although it will be appreciated that the thermometer 21 may be made in a variety of sizes and with a variety of materials, the plates 23, 25 are preferably made to have a radius of about 5.5" measured from the centerpoint 95 to the outer edges of the plates located by the temperature scale 39, and a radius of about 4.125" from the centerpoint 95 to the opposite edge of the plates. The annular segment comprising the window 37 has a radial chord of about 1.5", with the outer edge 54 tracing an arc at a radial distance from the centerpoint 95 of about 3.875" and the inner edge 53 of the window 37 tracing a corresponding arc at a radial distance of about 2.4". The plates 23, 25 are formed of polymeric material, and preferably, a medium to high impact styrene. The member 29 is preferably formed as a substantially flat disk with a radius of about 4" and a thickness at the outer portions 59 of about 0.05".

The spring 35 is preferably chosen so as to have about 180° of angular deflection, is heat treated at 400° for one hour after forming, and is not fixtured. The material of the spring 35 has a flexation of about $215 \times 10^{-7}$ (50°–200° F.) per ASTM TM2, a thickness of about 0.013". The metal from which the spring is coiled has a width of about 0.25" and a length of about 12". The outer end 91 of the spring 35 has a length of about 0.5".

The shaft 31 has the neck portion 69 with a diameter of 0.078" which is received in a corresponding aperture 65 in the member 29 having a diameter of 0.080" in diameter. The neck portion 69 extends longitudinally about 0.5". The tail portion 71 of the shaft 31 has a diameter of about 0.188".

Although the thermometer 21 illustrated in FIGS. 1–4 is designed with a lower portion corresponding to the lower end of the temperature scale and an upper portion corresponding to the upper portion of the temperature scale. One alternative embodiment of the present invention rotates the orientation of the thermometer 21 by about 90° counter clockwise from the position shown in FIG. 3. In this alternative embodiment, the window 37 extends in an arc with an apex at the center of the thermometer. The colored region 33, the spring 35, and the temperature scale 39 are reconfigured so that the lower end of the temperature scale is to the left of the apex and the higher end is to the right of the apex. Temperature is indicated by movement of the boundary 34 toward the right for increasing temperatures and toward the left for decreasing temperatures.

In still further alternative embodiments, the member 29 need not be shaped like a disk, but rather could be formed to be any shape capable of carrying the colored region 33 so that at least a portion of the boundary 34 is visible in the window 37 through the range of temperatures anticipated for the thermometer. For example, the member 29 is mounted about its center of mass, but could comprise a semi-circle corresponding to the colored region 33 with a counterbalancing portion extending opposite the semi-circle.

Further alternative embodiments may vary the angular deflection of the spring 35 and, correspondingly, the arc traced by the window 37 and the temperature scale 39 associated therewith. An angular displacement or a temperature range spanning less than 180° may be suitable for those applications which do not require the range of temperature indicated in the preferred embodiment of this invention. When the window 37 spans an arc of less than 180°, the colored region 33 may also be reduced from its semi-circular arrangement to a smaller sector of a circle, or any other size suitable for filling the window 37 to one side of the boundary 34.

Further alternative embodiments may vary the shape of the window. For example, the window 37 could be a sector of a circle, rather than the annular segment shown in the preferred embodiment. Still further alternative embodiments could vary the location of the temperature scale 39 by positioning it either on the window 37 or at another location on the face plate 23, so long at the temperature scale 39 remains operatively associated with the boundary 34 to indicate the temperature.

Further variations to the elements comprising the thermometer 21 are also, of course, contemplated within the scope of the present invention.

In addition to the advantages apparent from the above description, the thermometer according to the present invention allows temperature to be perceived under a variety of viewing conditions, especially under adverse viewing conditions.

As another advantage, condensation, frost, or dirt on the window of the thermometer will not obscure the temperature scale and thus not inhibit reading the thermometer.

As still further advantages, connection of the spring to the member and the member's rotation relative to the shaft not only reduces the weight of the member 29 which needs to be urged into motion by the spring but also reduces the friction encountered during such motion. These advantages, in turn, permit the thermometer according to the present invention to have an advantageously large size for easy viewing from a distance.

It is also advantageous that, when the thermometer is mounted with the lower end of the temperature to the bottom and the higher end to the top, the movement of the boundary simulates that of a conventional, liquid-filled thermometer. For certain viewers, therefore, it is possible that changes in temperature will be more easily understood by virtue of the inventive thermometer simulating a motion that may be more familiar to the viewer.

The construction according to the present invention offers numerous advantages. The face plate provides a large planar, stationary surface useful for printing of advertisement or other art and yet does not affect the readability of the thermometer. The spring, shaft, and connection to the moving member are enclosed within a housing and therefore protected from tampering or adverse conditions.

Still another advantage is that the large colored or shaded area visible through the window offers a vivid temperature indication readily understood even by those who cannot normally read or see the scale of the thermometer.

While the present invention has been described with reference to a preferred embodiment thereof, illustrated in the accompanying drawings, various changes and modifications can be made by those skilled in the art without departing from the spirit and scope of the present invention; therefore, the appended claims are to be construed to cover equivalent structures.

What is claimed is:

1. A thermometer comprising:
   a housing having a face plate, a central cavity in the face plate, a window on the face plate, a temperature scale operatively associated with and fixed in relation to the window, and a mounting plate having a central aperture,
   a shaft extending substantially orthogonally from the face plate to the mounting plate with the front end of the shaft being retained in the cavity in the face plate and the rear end of the shaft extending through the aperture in the mounting plate;
   a member mounted on a medial portion of the shaft and rotatable with respect thereto, the member having a colored region thereon with a boundary which is visible through the window at any temperature within the range of a temperature scale, the region being sufficiently large so that the colored region disappears in the window to one side of the boundary when the boundary is visible in the window, the member having a substantially unidimensional edge having a contact point with the medical portion of the shaft where the member is mounted to minimize friction between the shaft and the member; and
   a bimetal, coil spring having one end connected to the medial portion of the shaft and the other end connected to the member, the shaft being connected to the face plate so that changes in temperature cause the spring to rotate the member without causing the shaft to rotate.

2. The thermometer of claim 1, wherein the member has portions defining a channel therein, and wherein the other end of the spring is slip-fit within the channel.

3. The thermometer of claim 1, wherein the window has an edge which extends in an arc, the arc having a centerpoint, and the boundary extends radially in relation to the centerpoint across the window.

4. The thermometer of claim 1, wherein the member comprises a disk rotatably mounted within the housing, the colored region extends over a sector of the disk, and the boundary lies along one of the radii which form the sector.

5. The thermometer of claim 1, in which the face and mounting plates are substantially planar surfaces which are generally parallel to each other.

6. The thermometer of claim 5, wherein the aperture in the mounting plate extends through the planar surface of the mounting plate to allow the end of the shaft received therein to be accessed from outside the housing.

7. The thermometer of claim 6, wherein the end of the shaft accessible from outside the housing includes shaft portions which allow the shaft to be manually rotated within the aperture for calibrating the thermometer.

8. The thermometer of claim 7, wherein the shaft portions define a slit which extends into the shaft from the end received in the mounting plate.

9. The thermometer of claim 5, wherein the shaft has portions which abut the plates to resist inward flexion of the plates and a flange adjacent to the member to inhibit movement of the member toward one of the plates.

10. The thermometer of claim 1, wherein, when the thermometer is mounted to a substantially vertical surface, the window has a lower portion corresponding to the lower end of the temperature scale and an upper portion corresponding to the upper end of the temperature scale,
   whereby the movement of the boundary relative to the temperature scale simulates the movement of expandable liquid in a columnar thermometer.

11. The thermometer of claim 1, wherein the member is mounted about its center of mass.

12. The thermometer of claim 1, wherein the window has an edge extending over a first arc and the colored region extends over a second arc at least as great as the first arc of the window.

13. The thermometer of claim 12, wherein the window comprises an annular sector and the colored region comprises one of an annular sector or a sector of a circle.

14. The thermometer of claim 12, wherein the member is a bicolored disk and the first and second arcs extend about 180 degrees.

15. The thermometer of claim 1, wherein the temperature scale is located on the face plate and adjacent to the window.

16. The thermometer of claim 15, wherein the face plate includes a substantially planar region adapted for placement of at least one of a picture, character indicia, and an advertisement.

17. The thermometer of claim 1, wherein the shaft has a reduced diameter at the contact point with the member to reduce friction between the shaft and the member.

* * * * *